Inventor.
Rex E. Moule.
by Parker & Carter
Attorneys.

Jan. 18, 1944.       R. E. MOULE       2,339,286
METHOD AND MACHINE FOR MAKING CAPSULES
Filed July 25, 1939        2 Sheets-Sheet 2

Inventor.
Rex E. Moule.
by Parker & Carter
Attorneys.

Patented Jan. 18, 1944

2,339,286

UNITED STATES PATENT OFFICE 2,339,286

METHOD AND MACHINE FOR MAKING CAPSULES

Rex E. Moule, Dayton, Ohio, assignor to Moule Laboratories, Inc., a corporation of Massachusetts Application July 25, 1939, Serial No. 286,315

4 Claims. (Cl. 18—5)

This application relates to methods and machines for making capsules or the like of the type comprising sealed containers in which are quantums of filling material.

The invention provides a method and machines for automatically and repeatedly making satisfactorily shaped and filled capsules without waste of container or filling material, and at a low cost, both as to labor and as to material.

For an understanding of the method and machines herein illustrated, reference should be had to the accompanying drawings. In these drawings, Fig. 1 shows a machine of the invention;

Like numerals refer to like parts throughout the several figures.

Figure 1:
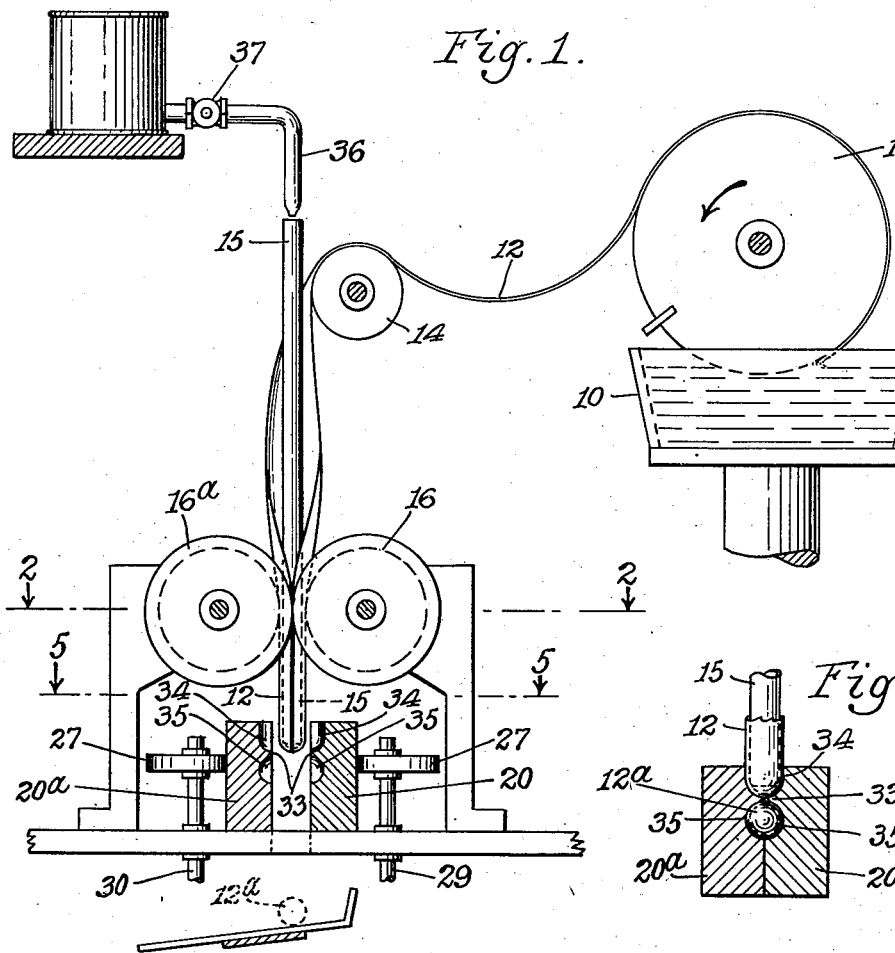
Figure 3:
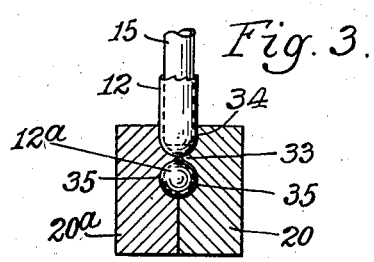
Figs. 3 and 4 show tube sealing and cutting and capsule severing and shaping means in closed and open positions, respectively.
Figure 2:
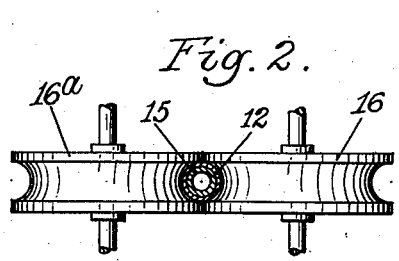
Fig. 2 is a section showing tube-forming rolls thereof, as if on line 2—2 of Fig. 1.
Figure 4:
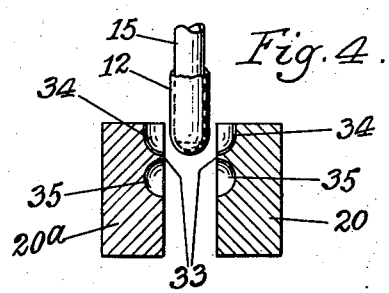
Figure 5:
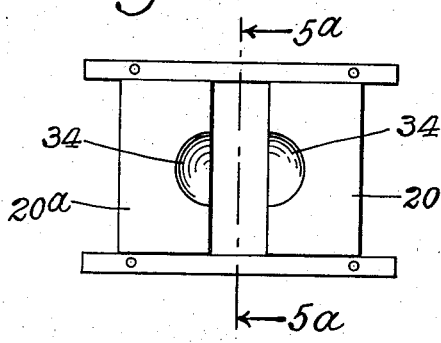
Fig. 5 is a section showing such means in plan as if on line 5—5 of Fig. 1.
Figure 5A:
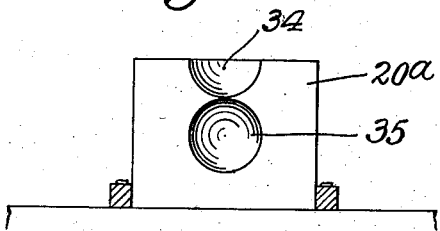
Fig. 5a is a section on line 5a—5a of Fig. 5.

This is a continuation in part of application Serial No. 99,886, filed September 8, 1936.

Referring to the drawings, it will be seen that in Figs. 1 to 6 inclusive there is shown a machine for repeatedly forming properly shaped capsules of the character described.

The invention includes a method and machine or apparatus for forming a tube of suitable flexible material and introducing therein and passing therethrough the desired material which the capsules are to contain and forming the tube into capsules while the material is therein. The tube may be formed in various ways, as, for example, by being formed around a hollow mandrel through which the filling material for the capsules is passed. In the drawings I have for purposes of illustration, shown one form of apparatus for carrying out the method of forming and filling the capsules. This apparatus includes a pan 10 containing suitable container material, preferably a plastic of the nature of gelatin, in which rotates a wheel 11 which picks up gelatin from the pan and forms it into a ribbon 12 leaving the wheel 11.

The ribbon is passed over a roll 14 which may or may not be driven, but preferably driven, and permitted to drop around a hollow mandrel 15 disposed between tube-forming intermittently rotating rollers 16 and 16a, between which rollers the ribbon is caused to descend, and these rollers serve to form the ribbon into a tube or sack around the hollow mandrel. The intermittently rotating rollers 16 feed formed tubing in unit lengths intermittently and repeatedly towards the lower end of the mandrel 15, and towards the means about to be described and positioned at the lower end of the mandrel for sealing and cutting off the lower end of the tube and for shaping that part of the tube severed from the remainder of the tube.

The means just mentioned comprises two sealing, cutting and shaping dies 20 and 20a caused to move towards and away from each other and towards and away from the axis of the mandrel, which axis is disposed between them, by any suitable means; such movement or reciprocation is synchronously timed to the intermittent rotation of the rollers 16, 16a so that the sealing, cutting and shaping operation is synchronized to and properly cooperate with the step by step feeding of the tube along the mandrel. The dies 20 and 20a include tube sealing portions 33 which also act to cut off the tube at the points where the portions 33 meet; the dies also include tube shaping portions 34 for shaping the lower end of the tube just above the seal formed therein; and the dies also include capsule shaping portions 35 for shaping the capsule severed from the tube.

Figure 6:
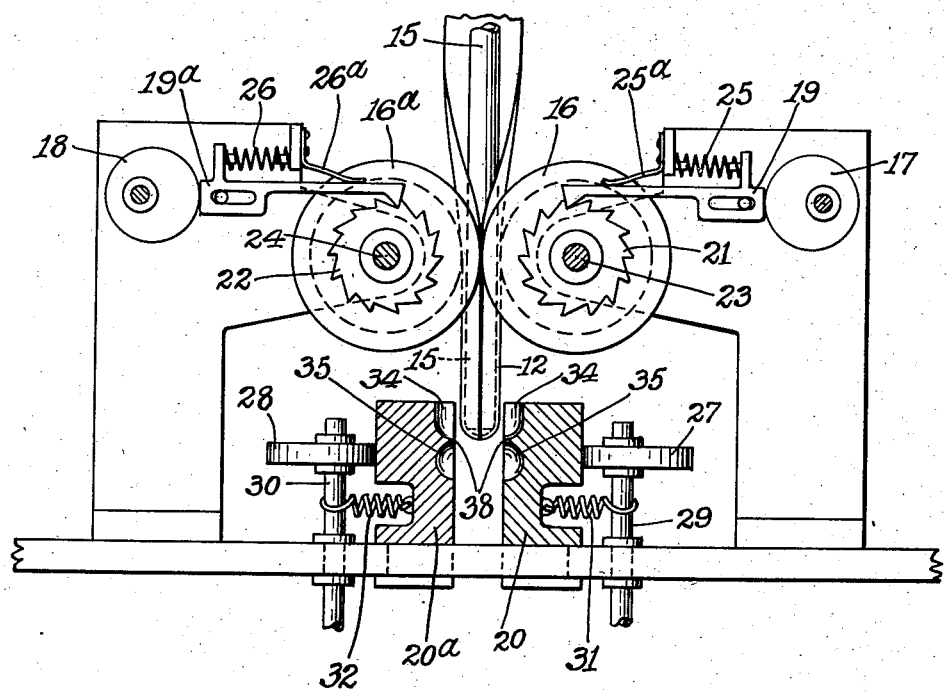
Fig. 6 is a view showing one means for moving the dies toward and from each other.

One simple means is shown in Fig. 6 wherein the rollers 16 and 16a are moved intermittently to feed the tube along the mandrel, step by step, by the eccentrics 17 and 18 which actuate the pawls 19 and 19a which engage the teeth of the ratchets 21 and 22 on the roller shafts 23 and 24. The pawls 20 and 21 are kept in contact with the eccentrics by the springs 25 and 26. The dies 20 and 20a are moved intermittently by the eccentrics 27 and 28 on the shafts 29 and 30, which as they are rotated, engage the dies 20 and 20a to close them. The dies are retracted or opened by the springs 31 and 32. The springs 25a and 26a elastically press the pawls against the ratchet wheels, but permit them to rise to slide over the teeth as the pawls are retracted. It will be noted that the capsule forming device has separable parts and they are opened and closed and the end of the tube is moved down between them when they are open. Its movement is then stopped and the separable members are then closed to form a capsule.

The operation of the machine here shown is substantially as follows. Tubing is formed around the mandrel 15 from ribbon 12 and is fed in steps of unit length along the mandrel intermittently and repeatedly. During the feeding of tubing along the mandrel, filling material is introduced into the mandrel, so as to be deposited in the lower end of the tubing, through a filling spout 36 connected to a tank of filling material; the spout is controlled by a valve or the like 37 which may be operated to meter the quantum of filling material introduced into the tube. The filling is best performed intermittently and with the use of a metering valve and it is preferred to have the introduction of quantums of filling material timed to the advance of tubing along the mandrel so that the filling and the feeding of tubing are performed in synchronism, successively or simultaneously.

At the start of a succession of capsule forming operations it is necessary to seal the lower end of the tube. This may be done by the use of the tube sealing means 20, 20a, 34 and 38; previously described, and positioned around the lower end of the mandrel. After the lower end of the tube is thus closed off to start the succession of operations, and in proper synchronism, tubing is advanced along the mandrel, quantities of filling material are introduced into the tubing, and the dies 20 and 20a are reciprocated to seal the tube, to cut off the tube, and thus sever a capsule from the tube and leave the tube in a sealed condition, and to shape the capsule thus severed from the tube.

It will be seen that there is here described a method and apparatus by means of which gelatin in a solid plastic form in the shape of a ribbon is provided, this ribbon being passed between two grooved wheels or forming devices, to form a tube around a mandrel, the mandrel also extending between the grooved wheels, the gelatin being pressed by the wheels against the mandrel in forming the tube. The lower end of the tube is closed and capsule filling material is injected into the tube in metered quantities, the capsule filling material causing the tube to slip down over the mandrel so that its end projects beyond the mandrel, this end being filled with the material, the amount of the tube projecting beyond the mandrel being of sufficient length to form one capsule. The capsule forming device is made of separable parts with means for opening and closing them, and the end of the tube with the material in it is moved down between the separable parts of the capsule forming device when open, the material being fed by the metering valve when the capsule forming device is open. To insure this result the movement of the tube downward ceases when it has projected this sufficient length from the end of the tube to form a capsule and the capsule forming device is then closed and compresses the tube around the lower end of the mandrel so as to close the tube below the end of the mandrel, filled with this material, and form the capsule, the portion of the tube at the point where it is cut off being sealed. The capsule forming device then opens, another measured quantity of the material is injected into the tube and the operation above described is repeated. The tube may be moved down by the action of the grooved wheels alone, or by the combined action of the grooved wheels and the material injected into the tube, or by the injection of the material alone, the important factor being that this tube shall be moved when the capsule forming device is open, to project a sufficient length between the members of the capsule forming device so that when they are closed, a capsule is formed and the end of the tube between the capsule and the mandrel closed. By thus forming a single capsule as herein set out, waste of the capsule filling material is entirely prevented.

I claim:

1. Apparatus for forming sealed filled capsules, comprising a hollow mandrel, means for forming a tube of gelatinous material about said mandrel and moving it along the mandrel so that it projects beyond the end thereof, means for introducing capsule filling material into the mandrel and from the mandrel into the tube, and a capsule shaping device adjacent the end of the mandrel, said device having parts which engage the gelatin material about said mandrel and compress it around the end of the mandrel so as to close said tube and shape the portion of the tube below the end of the mandrel in the form of a capsule, and cut off said portion thus formed into a capsule.

2. Apparatus for forming sealed filled capsules comprising a hollow mandrel, means for forming a tube of gelatinous material about said mandrel, means for introducing capsule filling material into the mandrel and from the mandrel into the tube, a capsule shaping device adjacent to the end of the mandrel having parts which open and close and having a cavity the walls of which engage the gelatinous material, means for moving the filled end of said tube with the filling material therein between the parts of said capsule shaping device while said parts are open and for stopping the moving of said tube when a sufficient length thereof is between the parts of the capsule shaping device to form a capsule, and an actuating device for moving parts of the capsule shaping device to engage the filled end of said tube the size of said cavity being so proportioned to the size of the tube that the wall of the cavity contacts the wall of the tube to shape it around the filling material into a capsule.

3. The method of making capsules or the like of the type of sealed containers in each of which is a quantity of filling material, comprising the steps of providing a tube of material soluble in water, sealing one end of the tube, introducing a quantity of filling material into the tube and by means of an exterior pressure applied to the outside of the tube, shaping the sealed end of the tube around the filling material to form a capsule with the filling material therein and simultaneously sealing the capsule and the adjacent portion of the tube from which the next capsule is formed and before the said adjacent portion of the tube is filled with material.

4. The method of making capsules or the like of the type of sealed containers in each of which is a quantity of filling material, comprising the steps of providing a tube of material soluble in water, sealing one end of the tube, introducing a quantity of filling material into the tube and by means of an exterior pressure applied to the outside of the tube, shaping the sealed end of the tube around the filling material to form a capsule with the filling material therein and simultaneously sealing the capsule and the adjacent portion of the tube from which the next capsule is formed and before the said adjacent portion of the tube is filled with material, and severing the capsules from the adjacent portion of the tube.

REX E. MOULE.